United States Patent
Reinhard

(10) Patent No.: US 9,321,532 B2
(45) Date of Patent: Apr. 26, 2016

(54) ACCELERATION PROTECTIVE SUIT

(75) Inventor: Andreas Reinhard, Baar (CH)

(73) Assignee: G-nius Ltd., Singapore (SG)

( * ) Notice: Subject to any disclaimer, the term of this patent is extended or adjusted under 35 U.S.C. 154(b) by 393 days.

(21) Appl. No.: 13/885,790

(22) PCT Filed: Nov. 18, 2011

(86) PCT No.: PCT/EP2011/070433
§ 371 (c)(1),
(2), (4) Date: Aug. 5, 2013

(87) PCT Pub. No.: WO2012/066114
PCT Pub. Date: May 24, 2012

(65) Prior Publication Data
US 2013/0310633 A1    Nov. 21, 2013

(30) Foreign Application Priority Data

Nov. 19, 2010    (CH) .................................... 1948/10

(51) Int. Cl.
*B64D 10/00*    (2006.01)
*A62B 17/00*    (2006.01)

(52) U.S. Cl.
CPC ............... *B64D 10/00* (2013.01); *A62B 17/008* (2013.01); *B64D 2010/002* (2013.01)

(58) Field of Classification Search
CPC ............. B64D 10/00; B64D 2010/002; B64D 2010/005; B64D 2010/007; A61B 17/00; A61B 17/008
See application file for complete search history.

(56) References Cited

U.S. PATENT DOCUMENTS

| | | | | | |
|---|---|---|---|---|---|
| 3,392,405 | A | * | 7/1968 | Davis | B64D 10/00 2/2.14 |
| 5,153,938 | A | * | 10/1992 | Epperson | B64D 10/00 2/2.14 |
| 5,537,686 | A | * | 7/1996 | Krutz, Jr. | B64D 10/00 2/2.14 |
| 2004/0040064 | A1 | * | 3/2004 | Mah | B64D 10/00 2/2.14 |
| 2004/0168244 | A1 | * | 9/2004 | Reinhard | A62B 17/008 2/169 |
| 2007/0022508 | A1 | * | 2/2007 | Egli | B64D 10/00 2/2.14 |
| 2007/0289050 | A1 | * | 12/2007 | Nocente | A41D 13/005 2/458 |
| 2008/0275291 | A1 | * | 11/2008 | Reinhard | B64D 10/00 600/20 |

FOREIGN PATENT DOCUMENTS

| | | |
|---|---|---|
| DE | 102007053236 A1 | 5/2009 |
| GB | 2055287 A | 3/1981 |
| JP | 200812958 A | 1/2008 |
| WO | 03020586 A1 | 3/2003 |
| WO | 2005123504 A1 | 12/2005 |

* cited by examiner

*Primary Examiner* — Charles A Marmor, II
*Assistant Examiner* — Thaddeus Cox
(74) *Attorney, Agent, or Firm* — The Webb Law Firm

(57) ABSTRACT

The altitude-optimized, pressurized suit consists of a sheath of a sparingly expansible textile material. This sheath has fastened in it, and on it, by sewing, adhesive bonding or welding, compartments which are formed by virtue of the sheath being doubled, in that a strip of textile material is applied to the inside, or in the second case to the outside, of the sheath, and therefore it is connected to the sheath if only along its periphery. These compartments likewise consist of textile materials, in the first case of the same material as the sheath, and in the second case of an expansible knitted fabric. Flexible tubes-which expand under pressure are introduced into these compartments. The first-mentioned compartments act as "spacers" for tightening the suit over the topography of the wearer's body. The second-mentioned compartments act as "muscles" and press locally onto the wearer's body.

13 Claims, 11 Drawing Sheets

$\Delta DC_{810}/Gz$

ACCELERATION PROTECTIVE SUIT

BACKGROUND OF THE INVENTION

1. Field of the Invention

This invention concerns an acceleration protective suit for the crew of high-performance aircraft. Such protective suits are available in some executions. They are classified into different type of suits—those which are supplied with air as compressed fluid, the so-called pneumatic protection suits, and suits which work based on the hydrostatic principle. The latter type either creates hydrostatic pressure directly on the person wearing the suit or it is provided with fluid veins that pass through mainly the local and instantaneous Z-axis and increase the internal pressure of the liquid column correspondingly by shortening the size of the protective suit. Together they are known simply as hydrostatic protection suits, although the fluid is not restricted to water alone.

2. Description of Prior Art

The invention especially involves a pneumatic protective suit. Few such protective suits are already known, for example from EP 1 755 948 which is closest to the prior art, furthermore there are also a few from US 2007/0289050, JP 2008 012 958 and DE 10 2007 053 236. Document WO 03/020586 A1 discloses a protective suit made of low-stretch material with double-walled compartments or bags. In the compartments, there are flexible plastic pipes laid. The air pipes are loadable with acceleration-dependent air pressures and thus stretchable as bubbles.

In such protective suits, the parts or regions of the body that are to be protected are surrounded by the protective suit or parts of it. The parts and regions of the body that are especially subject to extreme accelerations are thereby pressurised within such protective suits via bladders or pipes impinged with compressed air or gas subject to the accelerations in the instantaneous and local Z axis, known as $G_z$, by which the haemostatic pressure is counteracted. This is the overall object of such a protective suit.

The costs for an effective G-protection are still considerable with traditional suits and it is this invention's intention to reduce these costs with a new suit. This protective suit should be effective under all circumstances and in all conditions without special actions from the wearer, which are the case in traditional suits, especially in the border areas. Traditional protective suits are relatively heavy, stiff and the wearer sweats easily in it, which negatively impacts his mental state. Some suits may cause foot and arm pain for the wearer. With regard to breathing induced by excess pressure (Positive Pressure Breathing PPB), it is not proven from a medical perspective. Therefore, in addition to ensuring an absolutely reliable G-protection, i.e. reliably prevent a so-called G-lock, an improved G-protective suit should ensure this G-protection with low costs as far as possible and without making breathing under excess pressure a necessity. It should display its optimal effect in all situations without the user exerting any influence, i.e. without "Anti G Straining Manoeuvres" (AGSM) and as far as possible, it should offer high wearing comfort, similar to underclothes. It should thus prevent premature exhaustion of the wearer and reliably prevent aches. Moreover, it should automatically offer better protection, i.e. ensure adequate protection in case of a sudden drop in pressure and provide support for buoyancy in case of immersion in water. Optionally, it should include an active cooling device. The suit should be manufacturable as a standard suit and tailoring of such suits for each individual wearer, which was required previously, should be made obsolete.

This is brought about via a pressure regime where different parts of the body or the protective suit, with reaction forces, are supplied with different pressures. Different regions of the protective suit are developed differently for this purpose.

As the contact pressures of the protective suit covering vary on the body of the wearer, the bladders which cause these pressures should be designed in different sizes depending on the part of the body to be protected. As learned from the state of the art documents, the volumes of the bladders are proportionally large, which, in combination with the compressibility of air and allowing for the high onset rates of $G_z$, leads to a slow reaction of the protective suit.

The object of the present invention is to control the internal pressure of the body protected by the protective suit in accordance with the relative height of the body to be protected and in accordance with the effective local and instantaneous acceleration, $G_z$, and to also minimise the volume to be filled. The protective suit should furthermore be comfortable to wear without requiring an exact fit. It should be easy to wear and remove without need for breathing in excess pressure and it should provide a high level of protection and climate control.

Another object of this invention is to alleviate the venous return of the wearer due to rhythmic changing of this internal pressure.

SUMMARY OF THE INVENTION

The suit, according to the invention, comprises a covering made of stretch-resistant textile material that is resistant to fibre elongation as well as bond stretching Pockets are fastened into and on this covering by means of sewing, gluing or welding, for example. These compartments are formed by doubling the covering, in which a strip of textile material is provided internally or externally on the wall so that it is attached to the covering only along its edges. These compartments are likewise made of textiles—of the same material as the covering in the first case, and a stretchable fabric, for example, that is laid on the inside of the covering in the second case. Flexible tubes made of an elastomer are inserted in these compartments which expand on pressurisation. The former compartments can be expanded by stretching the side lying against the body of the wearer along its volume in a relaxed state. They pre-stress the acceleration protective suit that is worn on an individual body to such an extent that the peripheral tension a builds the required internal pressure in the body of the wearer. The latter compartments that cannot be expanded further tighten the covering by being constricted along their breadth under high pressure in the air tube.

As a further addition of the inventive idea, partially filled veins of water can be optionally inserted in the compartments of the first type, which extend from the feet to the throat section. These contain multiple air pockets which are fastened inside the water veins and are sequentially filled with compressed air from bottom to top. Thus the water is displaced from bottom to top and forms a rhythmically increasing and, in the case of sequential or complete venting of the air pockets, decreasing pressure in the acceleration protective suit. This relieves the cycle and increases the electrolyte level of the heart.

BRIEF DESCRIPTION OF THE DRAWINGS

The inventive idea is explained in detail with the help of the enclosed drawings, which show.

DETAILED DESCRIPTION OF THE INVENTION

Figure 1A:
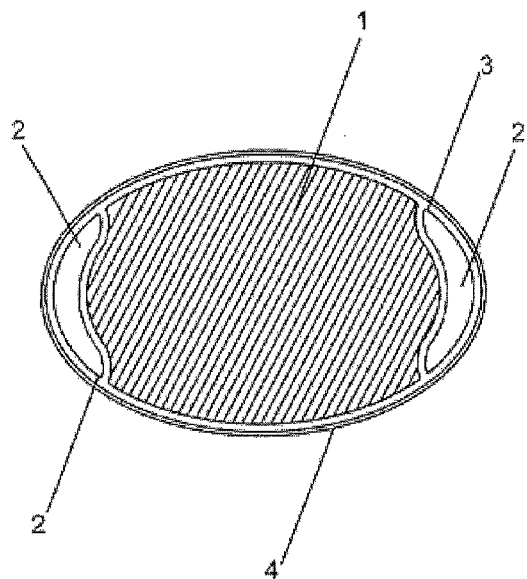
FIG. 1a a schematic cross-section through a part of the body in an inactive state of the protective suit, FIG. 1b the same cross-section in the activated state of the protective suit, FIG. 2a, b an air tube of the first type, known as "Spacer" in the cross-section, FIG. 3a, b an air tube of the second type, known as "Muscle" in the cross-section, FIG. 4 a compartment with an inactive spacer and inactive high pressure bladder, FIG. 5 a compartment with an active spacer and active high pressure bladder, FIG. 6 front view of the protective suit, FIG. 7 rear view of the protective suit, FIG. 8 a schematic longitudinal section via a water vein, FIG. 9a a top view of a climate control tube without air, FIG. 9b a top view of a climate control tube with air, FIG. 10 a diagram with comparative data for sustainable G-load when wearing a traditional protective suit and when wearing a protective suit according to the invention, FIG. 11 a diagram with comparative data for heart rate curve with G-normalised load when wearing a traditional protective suit and when wearing a protective suit according to the invention, FIG. 12 the G-load thresholds in the z-axis of the protective suit according to the invention in comparison with three traditional protective suits A, B and C, FIG. 13 the average variation of the cardiovascular parameters, i.e. the direct components (constant components) in comparison to the baseline, considering the normalised and relatively achieved Gz load with different protective suits.
Figure 1B:
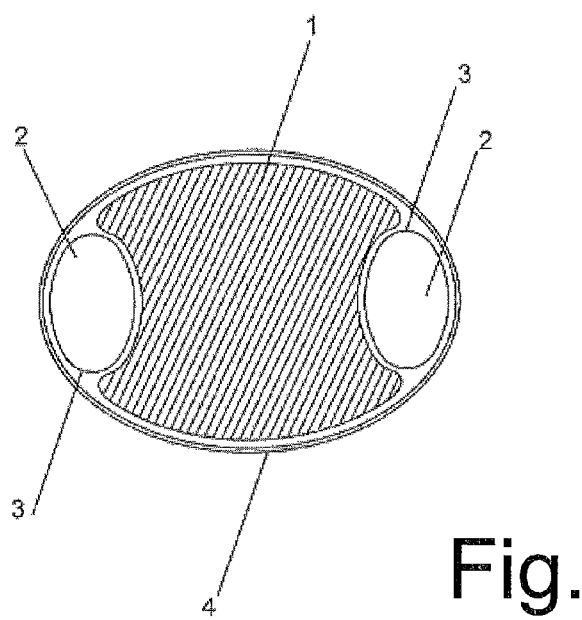

FIG. 1a schematically shows a cross-section through a part of the body 1, a thigh for example. This part of the body 1 fits closely, enclosed by a textile covering 4 of a protective suit. For example, two air tubes 2 are fastened inside the textile covering 4. The air tubes 2 are empty in FIG. 1a and lie flat between the part of the body 1 and the covering 4. The air tubes 2 are composed of an elastomer and are also flexible and elastic. As illustrated in FIG. 3, they are at least enclosed on one side by stretchable textile cover, at which they are fastened inside the suit 4, i.e. on every side of the textile covering 4 which faces the part of the body. If only the air tubes 2 are impinged on with compressed air, they tauten the covering 4 and this forms a peripheral tension a which, by means of the relation $$\sigma = p \cdot r,$$

forms a pressure p inside the body tissue. Thus $$p = \frac{\sigma[N/m]}{r[m]} \ [N/m^2]$$

p is inversely proportional to the tangential curve r of the part of the body.

The suit, comprising of covering 4, is preferably manufactured from a less stretchable textile with low bond and fabric elongation, aramid fibres for example. It is directly worn on the skin with which even the compressibility of classic underclothes is omitted. The suit can optionally be worn with specially adapted, sheer textile underclothes for hygienic reasons. The protective suit can however be washed in a conventional washing machine.

Figure 2A:
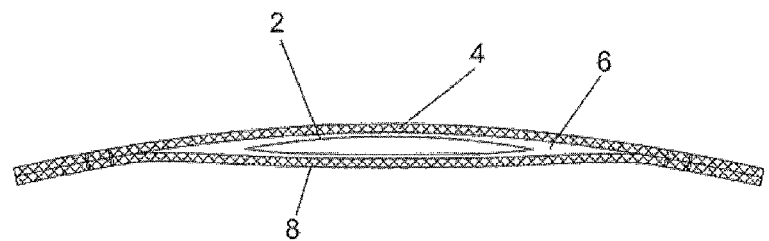
Figure 2B:
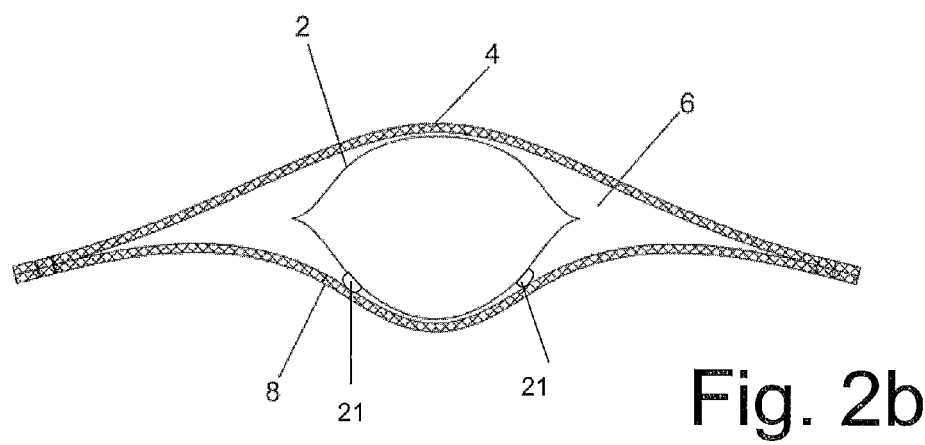

To develop the required internal pressure in the body of the wearer, only the air tubes of the special first type according to FIGS. 2a, b are suitable as displacers, which are henceforth known as "Spacer" due to their function. FIG. 2a shows a cross-section via a compartment 6 of such a "Spacer". The compartment 6 in FIG. 2a, b comprises of a cover 8 made of an elastic textile fabric or knitted fabric only on the side that faces the body of the wearer, while the opposite side of the textile compartment 6 is composed of non-elastic material. The indentation of cover 8 hardly contributes to the peripheral tension 0, while the covering 4 apparently transmits the pressure. However, such an air tube 2 presses against the body of the wearer with the cover 8 and directly produces the required internal pressure in him. These "spacers" thus do not cause a direct, specific contraction of the cross-section of the textile compartment. Instead, the "spacer" works by means of pressure created on the elastic inner side 8 of the textile compartment 6, which is on the surface of the wearer's body and thus creates a local pressure on this body part and the vessels under it. The peripheral tension o that thus develops as a reaction force is naturally transmitted through the covering 4 to the rest of the body so that it results in full tension of the protective suit on the body. Thus the topography of the wearer's body is compensated with these "spacers". The suit is thus made suitable for different body surfaces and a basic tension is generated so that the suit lies completely on the body surface of an individual wearer of the suit. This is the primary function of this compartment type named as "spacer". Depending on the fitness of the wearer of the suit on that day, this may still not be sufficient to create the required internal pressure. As a result, other compartments of the second type are used as described.

Thus it is the purpose of the suit according to this invention, not to provide a custom-tailored clothing for each pilot, but to aim for a standard suit for a large class of wearers. The pressurisation from tubes 2 of the first type—hereinafter referred to as "spacer"—is used exactly for this purpose.

The air tube 2 of the "spacer" can have ventilation veins 21 passing lengthwise, which are provided with lip-shaped openings. Air can escape through these lip-shaped openings, which is blown in by a separate fan that is electrically integrated into the protective suit. This fan that is integrated in the protective suit sucks in the external air and blows it into the ventilation veins 21. Air then gets into the inner area of the textile compartment and then onto the body surface of the wearer through the adjacent textile tissue due to the excess pressure in the textile compartment. It thus creates a cooling effect for the wearer.

Figure 3A:
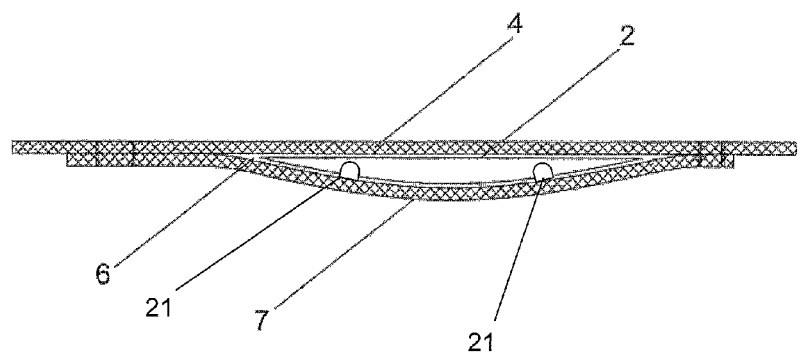

FIGS. 3a, b show a cross-section through an expandable air tube 2 in a textile compartment of the second type. The expandable tube 2 made of elastomer is inserted into a textile compartment 6 made of similar, less expandable textile material just like the covering 4 of the suit. Air tubes inside the suit 4 are fastened to this textile compartment 6, whereby the contours of the air tubes are laid all over each textile compartment 6. If the air pressure in the air tube is greater than the pressure outside, then the tube inflates itself. The textile material of the textile compartment cannot be expanded and thus the width of the textile compartment is shortened when compared to its width when the textile compartment is flat. Therefore the protective suit tightens around the extremities of the wearer. Ventilation veins 21, as shown here, are optional and are laid out separately in the protective suit. These are laid along the air tubes 2 in the textile compartment 6 and are integrated in air tube 2 so that a smooth surface is formed. This surface lies adjacent to the inner side of the textile compartment 6. One can see these ventilation veins 21 here in the cross-section. There are a number of lip-shaped openings on the side towards the textile material. These lips open up when there is increased internal pressure and air flows in a diffusive manner through the breathable adjacent text material to the surface of the wearer's body and cools it. Air supply takes place through the electrical fan as described already.

Figure 3B:
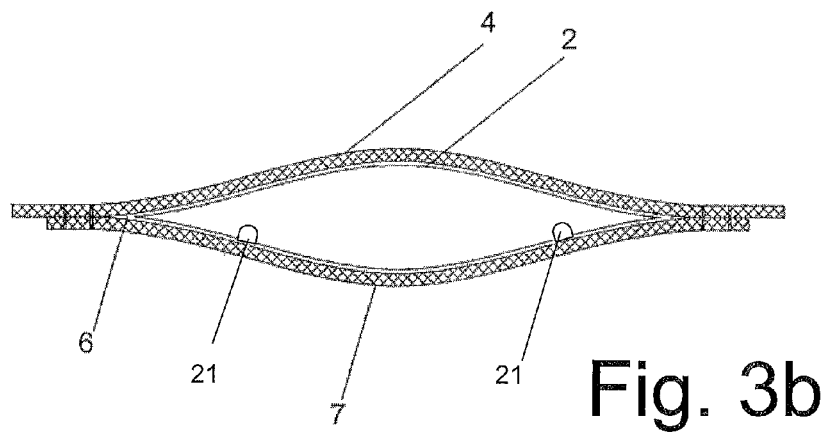

The tube 2 is empty in FIG. 3a and it is partially filled with air in FIG. 3b. Here one can see that separate ventilation veins 21 are inserted into the air tube 2 in such a way that it forms a smooth surface. Compartment 6 is formed from covering 4 and an—inner—cover 7, both made of the same, less elastic material of the covering 4 of the suit. When the air tube 2 is inflated, it first fills the whole compartment 6 and thus shortens the lateral dimension or width of compartment 6. Therefore the textile compartments thus formed are called "muscles". These "muscles" shorten their non-expandable sheath and thus create a homogeneous pressure on the body of the wearer.

Figure 4:
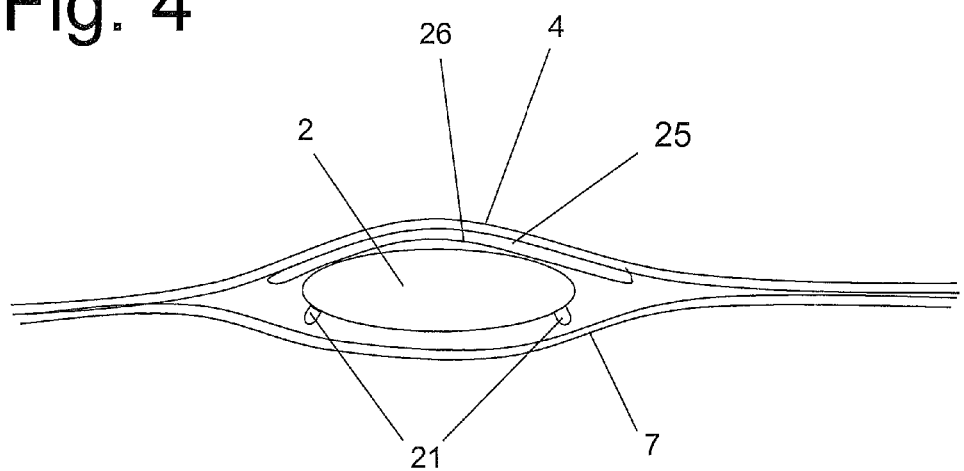
Figure 5:
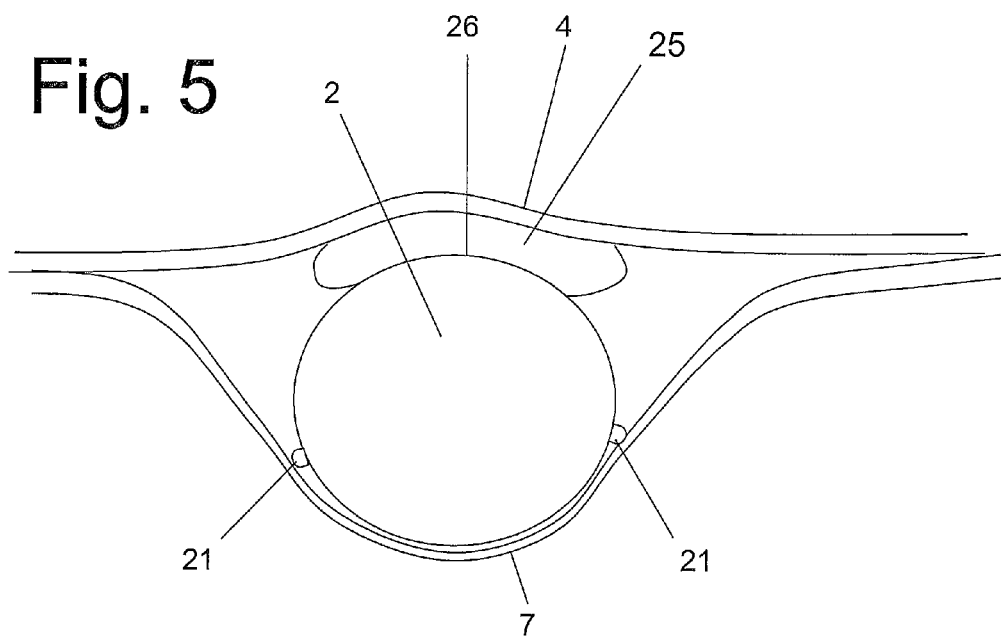

FIG. 4 shows another execution of a textile compartment of the first type with an air tube 2 that works as a "spacer" with both the different sides, 4 and 7, of the textile compartments, namely the non-elastic side 4 and the elastic side 7. A thin-walled, closed and separate plastic bladder 25 is incorporated as a special feature between the air tube 2 and the non-elastic external side of the textile compartment. When there is a decrease in external pressure, this will be inflated in volume and the inner side 26 of bladder 25, which is opposite to air tube 2 of the "spacer", lies adjacent to this and acts as automatic compensation for the decreasing high pressure when the aircraft is climbing. This bladder 25 is inactive in FIG. 4, because the external pressure has not decreased significantly. FIG. 5 shows what happens when the external pressure decreases. Correspondingly, the bladder 25 expands and the air tube 2 of the spacer expands as well. This results in a compensation of the decreasing high pressure. This additional bladder 25 can also be created by mounting an additional thin elastic rubber membrane externally on the air tube 2, where the membrane will be adjacent to the covering 4, so that the air tube 2 with its external side forms the inner side 26 of the bladder 25. As a result this combination in the protective suit becomes less stiff.

Figure 6:
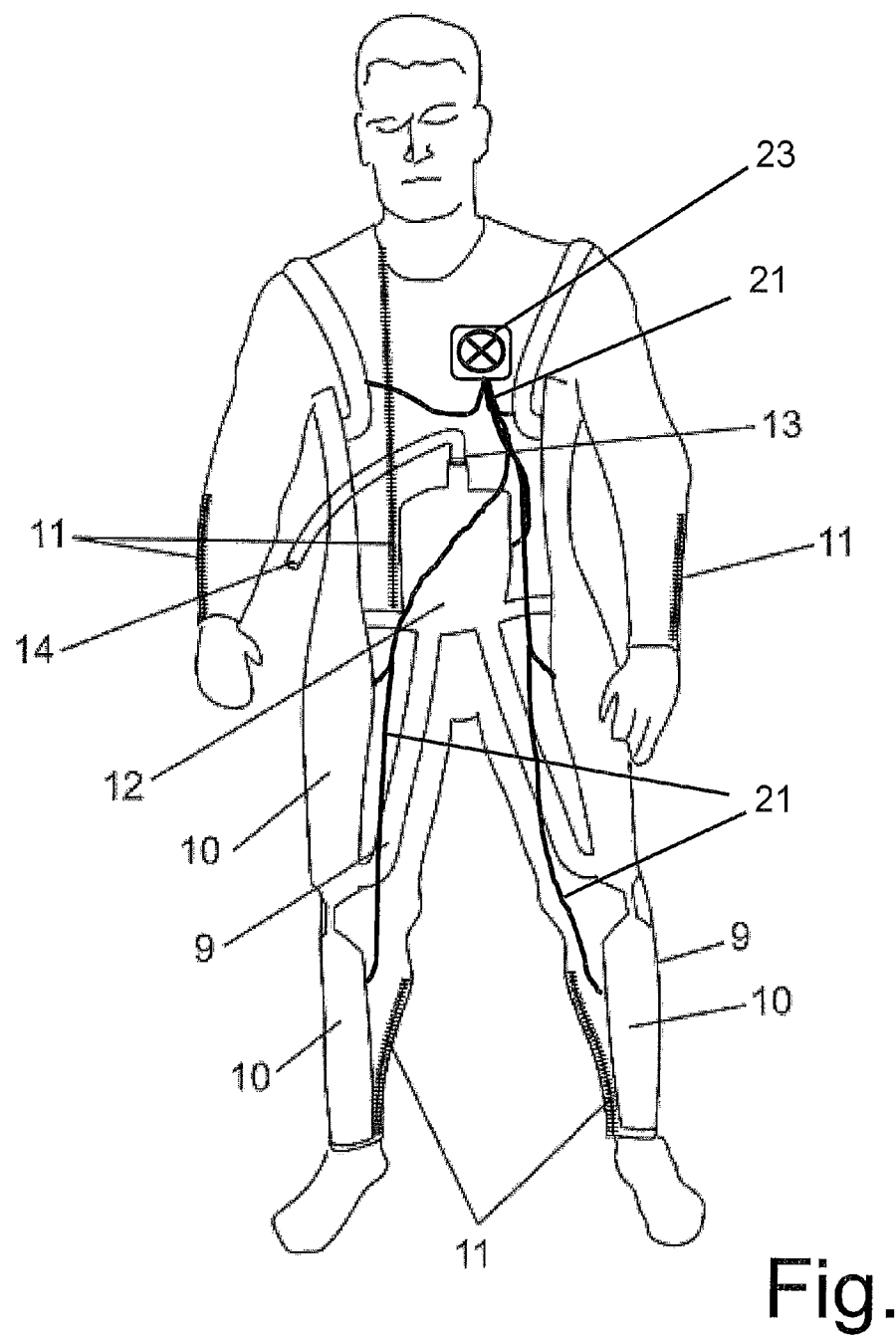
Figure 7:
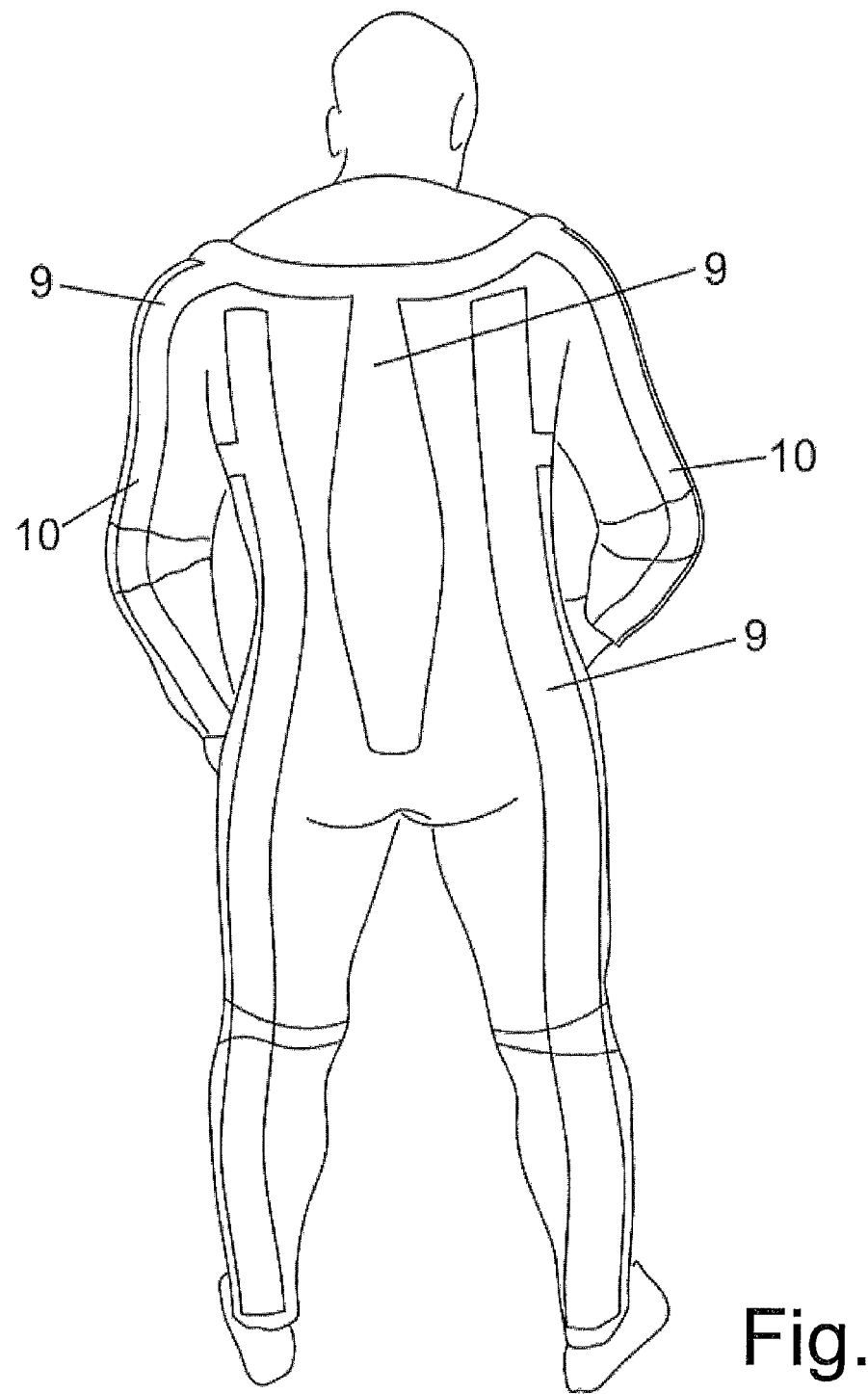

FIGS. 6 and 7 show a suit—constructed according to this inventive idea—with textile compartments working as "spacers" on one hand and textile compartments workings as "muscles" on the other hand. Here the air tubes are marked according to their type which is preferably assigned to the individual locations. Since this depends on the physique of the wearer, but can also be subject to individual preference, alternative allocations are also possible. Air tubes of the first type—i.e. "spacer" according to FIG. 2a, b—have the reference number 9 and the second type—i.e. air tubes functioning as "muscles" according to FIG. 3a, b—have the number 10. Preferably 40% of the textile compartment of a protective suit covering the body has either a spacer function or a muscle function, or both the functions provide approximately the same textile compartment surface on the body of a wearer.

A suit, according to FIG. 6, has a zipper 11 in all four limbs, similarly a main opening from throat to the groin, whereby this zipper can also be arranged centrally differing from the one shown here. A central pressure bladder 12, with which all air tubes 9, 10 communicate directly or indirectly, has a main valve 13. The connection to the compressed air supply of the aircraft is established at this valve, generally with the help of a tube 14. An air tube 9, 10 each is laid along the arms and legs, where both can be pulled up from the knee up to the thorax. The feet and hands remained uncovered by the suit.

The main valve 13 also functions as a safety valve. This closes the air bladder 12 immediately from the environment, as soon as the cabin pressure drops due to any reason, or
the pressure supplied by the aircraft fails.

At such a moment the suit functions as a pressure suit and keeps the pressure conditions stable within uncritical thresholds. With this acceleration protection suit according to the invention, conventional, approved overalls can be worn, if need be, with additional functions for the protection of ABC influences and/or cold water. Furthermore, the suit is equipped with an electrical fan 23, which is supplied by a battery carried on the suit itself. Ventilation veins 21 go out from this fan 23 into various air tubes 9, 10 and are laid out along with these as shown and are integrated smoothly in its surface.

Figure 8:
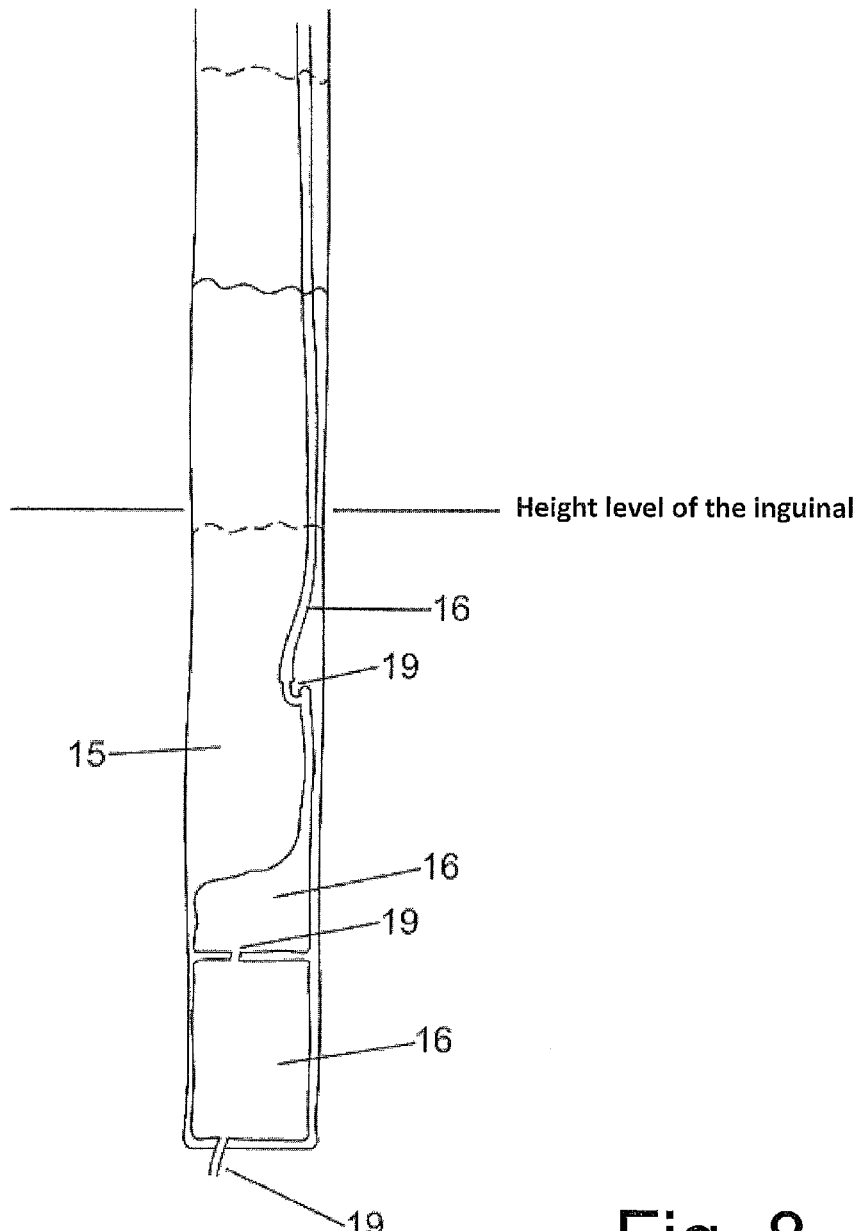

FIG. 7 shows the same suit seen from the back side. Air tubes 9 functioning as a "spacer" are easily visible, which extend from the feet up to the thorax. There is an air tube 9 in the middle of the spine that appears broader than the "spacer". FIG. 8 shows a longitudinal section through an optional water vein 15 in a schematic drawing. Three or more air pockets 16 are shown. The lowermost air pocket 16 is already filled completely, the second air pocket 16 is filled partially and the third air pocket 16 is still empty. The air pockets 16 are fixed to the water vein 15. Furthermore they are connected with an air pipe 19, which joins the water vein 15 from below, and is connected with a device. This device is supplied directly or indirectly by the compressed air supply of the aircraft. The water vein 15, which is filled with water up to groin height in case of empty air pockets 16, will be lifted around the volumes of the air pocket 16 when the upper air pocket 16 is inflated. If the next air pocket 16 is inflated, then the water will increase around its volume. The same is applicable when inflating the air pocket 16. Subsequently all air pockets 16 will be ventilated resulting in the reduction of water level to the original height. Additionally generated tension in the upper part of the covering 4 of the protective suit will reach the original value again. The sequential aerating and venting of air pockets 16 creates a massage effect which in turn reduces cardiovascular stress.

Figures 9A, 9B:
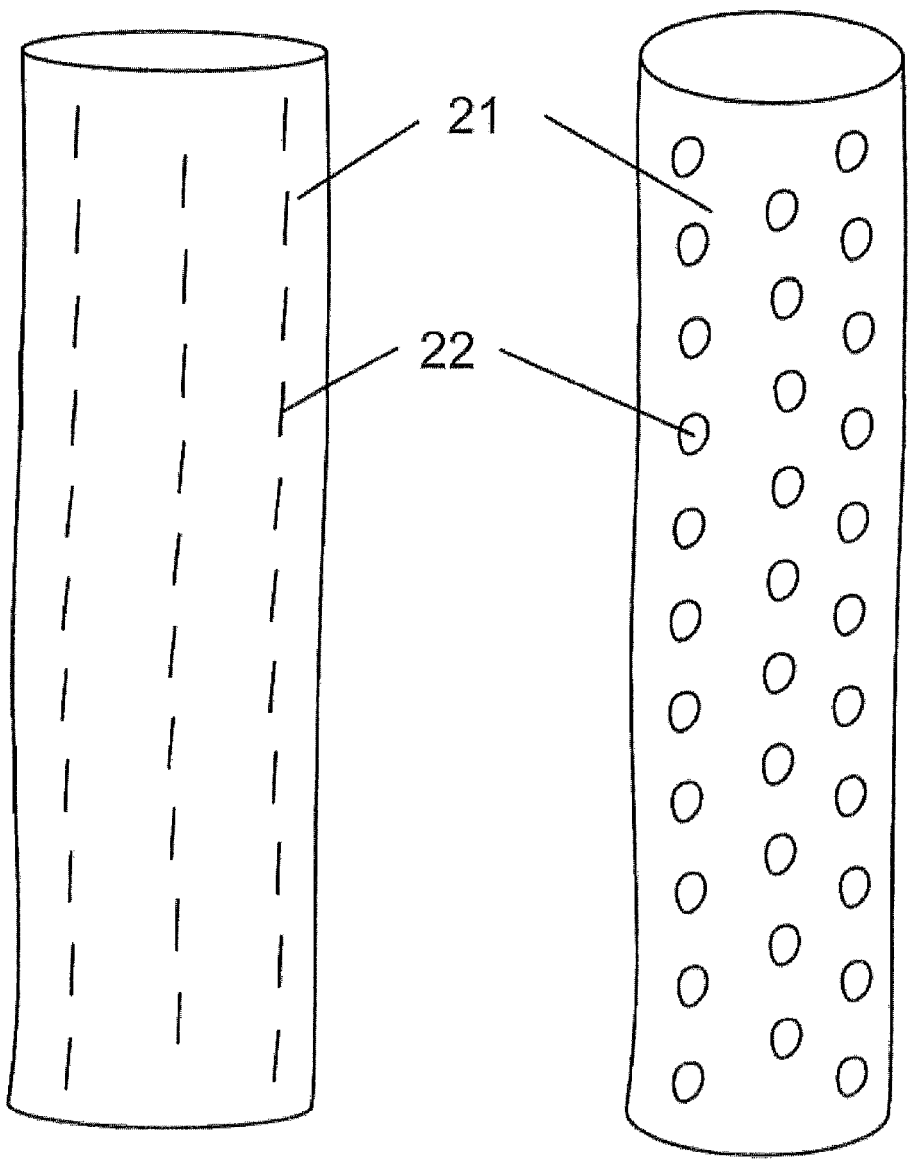

The ventilation veins 21 are shown in FIGS. 9a, b and these are used for ventilation and cooling. There are multiple such ventilation veins 21 made of elastomer in the covering 4 of the suit and they are fixed. They are flat when the suit is empty. They have multiple lip-shaped openings 22, which, as shown in FIG. 9b, open up under increased internal pressure in the ventilation veins 21 and create passage for air that flows through the ventilation veins 21. The ventilation veins 21 can be connected to the bladder 12, however this requires a check valve at the bladder 12 so that the main functions of the acceleration protective suit remain unchanged if there is pressure loss in the supply line from the aircraft or in the cockpit atmosphere. Alternatively, the ventilation veins 21 have their own air supply, either from the aircraft or autonomously from the suit with the help of a fan, which also has a power supply integrated in the suit. Thus the suit can be ventilated even if the pilot is outside the aircraft in standby position. From briefing room or maintenance room, which is often air-conditioned, he goes to the aircraft before a sortie and there, very high temperatures are often present in the aircraft to which the pilot is exposed for a short duration. This results in a situation where the pilot in a protective suit starts sweating profusely within a few minutes. But this is highly detrimental to his well-being and accelerates fatigue. Therefore it is very important that the body in a suit can be effectively cooled. This can be implemented through electrical ventilation through a fan 23 and ventilation veins 21.

Figure 10:
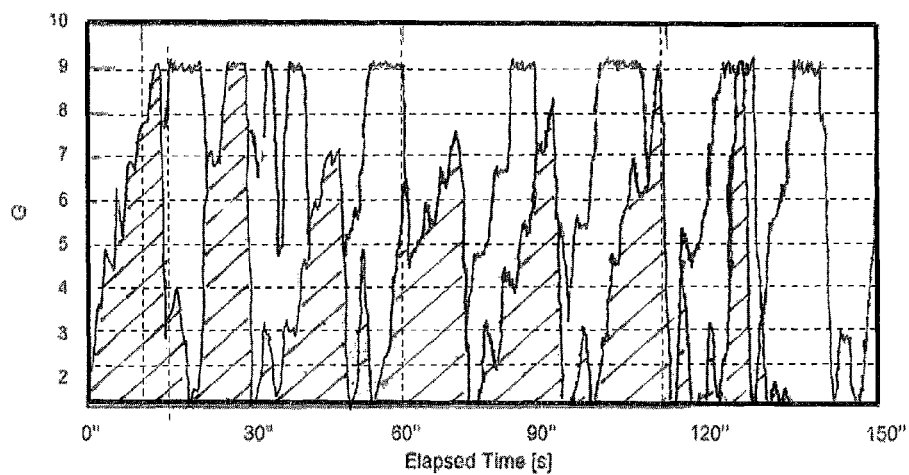

The practical results that can be achieved with such a protective suit equipped with "muscles" and "spacers" is astounding. They were measured in the spring of 2011 with the help of tests in one of the largest centrifuges for fighter pilots and are presented here in elementary form. There were 11 men and 1 woman in the test group with ages ranging from 27 to 56 and the group had flying experience ranging from 0 hours to 6400 hours. The data was calculated with 193 centrifuge trips for simulation of 43 different flights. By way of an example, FIG. 10 shows bearable G-load with a conventional G-protective suit, the so-called AEA suit from Air Crew Equipment Assembly from England, without such different textile compartments, when compared to the benefits provided by G-protective suit according to this invention. The integral of G-load endured by a 41-year old test person over time is recorded, where the cross-hatched surface represents the integral with the conventional protective suit and the integral below that shows the measurement achieved with the new protective suit. It has been proven that the integral with the protective suit according to the invention showed an impressive 76% more over a period of 150 seconds.

Figure 11:
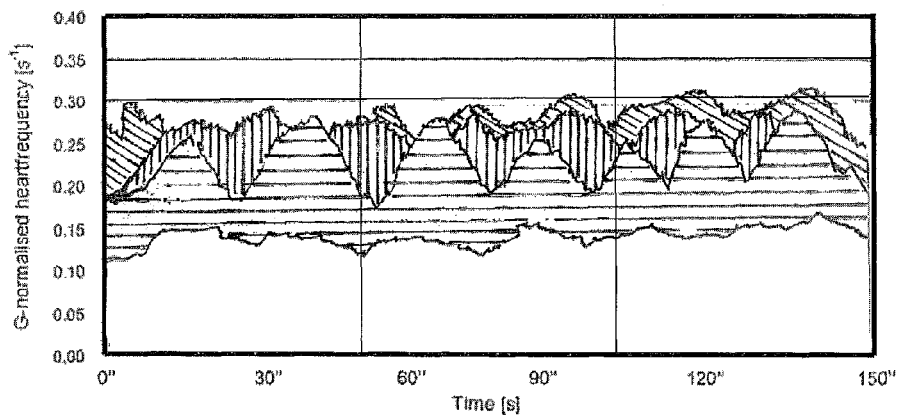

FIG. 11 shows the G-normalised average cardiac frequency of this test person when wearing different protective suits over 150 seconds of stress. The cross-hatched curves are the results with conventional protective suits, the deepest white curve is the result of the protective suit according to this invention. Qualitatively speaking the values achieved with this protective suit are very impressive; 44% deeper when compared with a suit with a vertical hatching i.e. in comparison with the G-protective suit from Life Support System & Aircrew Equipment Assembly (AEA) from England. The curve with horizontal hatching belongs to the hither to best G-suit of brand LIBELLE G-Multiplus® as used in Eurofighter, and the protective suit according to the invention is significantly better when compared with this suit too.

Figure 12:
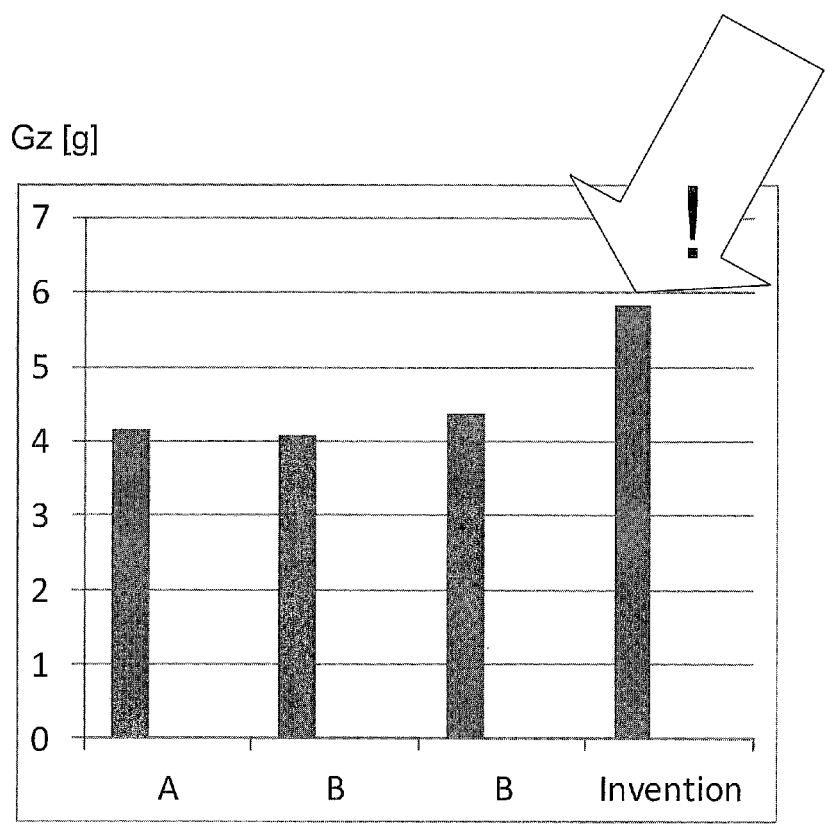
Figure 13:
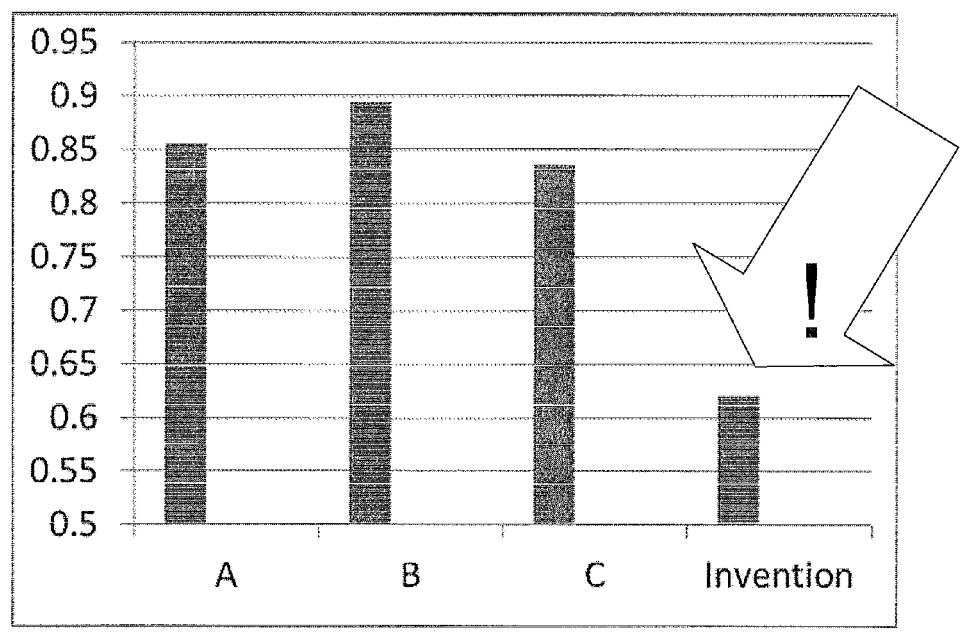

FIG. 12 shows the average G-load with various G-protective suits on the occasion of this test. 4.15±1.62 G, 4.08+1.82 G and 4.36±2.39 G were achieved with conventional protective suits A, B and C, 5.82±2.78 G was achieved with the G-protective suit presented here! And finally FIG. 13 shows a decisive result, which is the average variation of direct components (constant component) derived from cardiovascular parameters when compared with the base line, taking normalised and relatively achieved G-loads in the vertical z-axis into consideration, the so-called Volume Loss Index, i.e. $DC_{810\text{-}normalised}$ distributed through the average G-load. The result shown speaks for itself. Still such a suit weighs only 1050 gm and is therefore very comfortable to wear such as like a pyjama or underpants—it will be hardly felt. But its functions are very convincing and it is superior to the benefits offered by other G-protective suits.

The invention claimed is:

1. An acceleration protective suit for pilots of high-performance aircraft comprising a covering for a wearer made of stretch-resistant textile material, where at least parts of the covering comprise two walls and thus form compartments on inner and outer sides of the covering, where air tubes consisting of flexible and stretchable plastic are inserted in the compartments, and these air tubes are configured to be supplied with acceleration-dependent air pressures and thus are configured to be stretched as bladders, wherein the suit is equipped with at least two different types of compartments with air tubes for forming air bladders, namely a first type with compartments acting as spacers, the spacer compartments each comprising a first side made of an elastic textile fabric or knitted fabric facing the wearer, and a second opposite side made of an inelastic material, and which has loose air tube inside the spacer compartment, so that a contour is formed when compressed air is supplied to the air tube, which in turn differs from the spacer compartment containing it, the air tube inside the spacer compartment having a smaller volume than the spacer compartment interior, and a second type with compartments acting as muscles, where the muscle compartments are clung inside with tube material in their inner side, so that the muscle compartments and air tubes always have a same contour, and in addition there is a pressure bladder in the protective suit, which is located in an area proximal to the wearer's abdomen and to which all air tubes are connected, communicating freely with all air tubes in all compartments, whereby the pressure bladder has at least one main valve to which compressed air supply of the acceleration protective suit is configured to be connected and which is set up in such a way that it closes, if the compressed air supply pressure and/or pressure in cockpit drops.

2. The acceleration protective suit according to claim 1, wherein, in case of compartments acting as muscles, these compartments are made of a material like the covering, whereby the muscles are restricted in their volume, and in case of compartments acting as spacers, the first side of the compartments is made of stretchable elastic material, so that the spacers are configured to be stretched as part of elasticity of the compartments.

3. The acceleration protective suit according to claim 1, wherein the spacer compartments have closed, thin-walled bladders at sides positioned against the protective suit's outer side to compensate for reduced barometric pressure.

4. The acceleration protective suit according to claim 1, wherein the muscles and spacers of the acceleration protective suit stretch over the wearer's arms, legs, thorax, spine and stomach, which are covered by the protective suit.

5. The acceleration protective suit according to claim 1, wherein the protective suit includes an electrical fan for sucking in ambient air and supplying the same to ventilation veins, which are laid separately in the protective suit and ventilation veins with a number of holes with closing lips are placed in the compartments that act as spacers, through which air is supplied into the compartments by the fan over separate ventilation veins, where the air is diffused by the first side compartment material, for cooling the wearer's body surface.

6. The acceleration protective suit according to claim 1, wherein the protective suit includes an electrical fan for sucking in ambient air and supplying the same to ventilation veins, which are laid separately in the protective suit and ventilation veins with a number of holes with closing lips are integrated in the compartments that act as muscles, through which air is supplied into the compartments by the fan over separate ventilation veins, where the air is diffused by the first side compartment material, for cooling the wearer's body surface.

7. The acceleration protective suit according to claim 1, wherein the protective suit includes an electrical fan, for sucking in ambient air and supplying the same to ventilation veins that are laid separately in the protective suit, and that ventilation veins with a number of holes with closing lips are placed in the compartments acting as spacers along air tubes, whereby air is delivered into the spacer compartments via the ventilation veins when there is increased air pressure, whereby air is diffused by the first side compartment material for cooling the wearer's body surface; likewise there are ventilation veins with a number of holes with closing lips in the compartments acting as muscles along the air tubes, which are integrated opposite to the muscle compartments' inner sides, where air is delivered via ventilation veins when there is increased air pressure and which is diffused by adjacent compartment material for cooling the body surface of the wearer of the protective suit.

8. The acceleration protective suit according to claim 1, wherein at least 40% of the compartments superficially located on compartment sides of the acceleration protective suit adjacent to the wearer's body are compartments configured to act as spacers and at least 40% are compartments configured to act as muscles.

9. The acceleration protective suit according to claim 1, wherein half of the compartments superficially located on compartment sides of the acceleration protective suit adjacent to the wearer's body are compartments configured to act as spacers and half are compartments configured to act as muscles.

10. The acceleration protective suit according to claim 1, wherein the pressure bladder supplies compressed air to air pockets and also has a device to which the air bladder is connected and is configured to achieve a clocked pumping of air pockets.

11. The acceleration protective suit according to claim 10, wherein the device for clocked pumping of air pockets connected to the pressure bladder interacts with compartments of the first type, where the compartments stretch from the wearer's feet up to the wearer's throat section and which has veins partially filled with water and multiple air pockets, which are affixed inside the water veins and are configured to be filled with compressed air sequentially from bottom to top, so that the water is pushed from bottom to top and which builds a rhythmically increasing and, in a case of sequential or total venting of the air pockets, decreasing pressure in the acceleration protective suit, for relieving circulation or for increasing of the wearer's heart's electrolyte level.

12. The acceleration protective suit according to claim 1, wherein the air supply of ventilation veins are supplied by the bladder.

13. The acceleration protective suit according to claim 1, wherein the pressure bladder connects downstream to another check valve and upstream to ventilation veins, which closes if there is a sudden pressure loss in the aircraft's supply line and/or in the aircraft's cockpit atmosphere.

* * * * *